(12) United States Patent
Kase et al.

(10) Patent No.: US 8,177,892 B2
(45) Date of Patent: May 15, 2012

(54) MEMBRANE COMPRISING OXYETHYLENE GROUPS

(75) Inventors: Akira Kase, Holland (NL); Yujiro Itami, Holland (NL)

(73) Assignee: Fujifilm Manufacturing Europe B.V., Tilburg (NL)

( * ) Notice: Subject to any disclaimer, the term of this patent is extended or adjusted under 35 U.S.C. 154(b) by 337 days.

(21) Appl. No.: 12/601,057

(22) PCT Filed: May 26, 2008

(86) PCT No.: PCT/NL2008/050310
§ 371 (c)(1),
(2), (4) Date: Dec. 17, 2009

(87) PCT Pub. No.: WO2008/143514
PCT Pub. Date: Nov. 27, 2008

(65) Prior Publication Data
US 2010/0162892 A1  Jul. 1, 2010

(30) Foreign Application Priority Data
May 24, 2007  (EP) .................................... 07108822

(51) Int. Cl.
*B01D 53/22* (2006.01)
(52) U.S. Cl. ............ 96/12; 95/45; 95/52; 96/4; 427/508; 427/595
(58) Field of Classification Search ................. 95/45, 52; 96/4, 12; 427/508, 595
See application file for complete search history.

(56) References Cited

U.S. PATENT DOCUMENTS

| | | | | |
|---|---|---|---|---|
| 3,074,834 | A * | 1/1963 | Kine et al. ..................... | 442/128 |
| 3,501,326 | A * | 3/1970 | Hochberg et al. ............... | 442/71 |
| 4,963,165 | A | 10/1990 | Blume et al. ..................... | 55/16 |
| 5,069,926 | A | 12/1991 | Iwata et al. ..................... | 427/40 |
| 6,656,252 | B2 * | 12/2003 | Kita et al. ........................... | 96/4 |
| 6,719,147 | B2 | 4/2004 | Strano et al. ................... | 210/490 |
| 6,860,920 | B2 * | 3/2005 | Simmons ........................... | 95/49 |
| 2002/0071915 | A1 * | 6/2002 | Schubert et al. ........... | 427/385.5 |
| 2003/0110947 | A1 * | 6/2003 | Kita et al. ............................ | 96/4 |
| 2004/0213985 | A1 | 10/2004 | Lee et al. .................... | 428/315.7 |
| 2005/0235825 | A1 | 10/2005 | Tin et al. ........................... | 95/45 |
| 2008/0017578 | A1 | 1/2008 | Childs et al. ................... | 210/650 |
| 2008/0070029 | A1 | 3/2008 | Hessing et al. ............. | 428/319.3 |
| 2008/0171156 | A1 | 7/2008 | Olijve et al. ............... | 428/32.26 |
| 2008/0171188 | A1 | 7/2008 | Van Baak et al. .......... | 428/305.5 |
| 2008/0182044 | A1 | 7/2008 | Itami et al. ................. | 428/32.26 |
| 2008/0182914 | A1 | 7/2008 | Itami et al. ................... | 521/50.5 |
| 2008/0193735 | A1 | 8/2008 | Hessing et al. ............ | 428/304.4 |
| 2009/0202813 | A1 | 8/2009 | Itami et al. ................. | 428/319.3 |
| 2009/0208677 | A1 | 8/2009 | Itami et al. ................. | 428/32.14 |
| 2009/0208678 | A1 | 8/2009 | van Baak et al. .......... | 428/32.18 |
| 2010/0132559 | A1 * | 6/2010 | Ishida et al. ......................... | 96/5 |
| 2010/0154641 | A1 * | 6/2010 | Kase et al. ............................ | 96/4 |
| 2010/0288122 | A1 * | 11/2010 | Liu et al. ............................ | 95/45 |

FOREIGN PATENT DOCUMENTS

| | | |
|---|---|---|
| WO | WO 2005/097304 | 10/2005 |
| WO | WO 2007/018425 | 2/2007 |
| WO | WO 2007/018427 | 2/2007 |

OTHER PUBLICATIONS

Patel et al., "Highly $CO_2$-Permeable and—Selective Membranes Derived from Crosslinked Poly(ethylene glycol) and Its Nanocomposites", Advanced Functional Materials, 14(7):699-707 (2004).
Lin et al., "High-Performance Polymer Membranes for Natural-Gas Sweetening", Advanced Materials, 18:39-44 (2006).
Sanchez et al., "Poly(ethylene oxide-co-epichlorohydrin) membranes for carbon dioxide separation", Journal of Membrane Science, 205:259-263 (2002).
Hirayama et al., "Permeation properties to $CO_2$ and $N_2$ of poly(ethylene oxide)-containing and crosslinked polymer films", Journal of Membrane Science, 160:87-99 (1999).
Zhou et al., "Preparation and properties of MPEG-grafted EAA membranes via thermally induced phase separation", Journal of Membrane Science, 267:90-98 (2005).
Lin et al., "Transport and structural characteristics of crosslinked poly(ethylene oxide) rubbers", Journal of Membrane Science, 276:145-161 (2006).
Lin et al., "Gas and Vapor Solubility in Cross-Linked Poly(ethylene Glycol Diacrylate)", Macromolecules, 38:8394-8407 (2005).
Lin et al., "The Effect of Cross-Linking on Gas Permeability in Cross-Linked Poly(Ethylene Glycol Diacrylate)", Macromolecules, 38:8381-8393 (2005).
Kalakkunnath et al., "Segmental Relaxation Characteristics of Cross-Linked Poly(ethylene oxide) Copolymer Networks", Macromolecules, 38:9679-9687 (2005).
Lin et al., "Gas Permeation and Diffusion in Cross-Linked Poly(ethylene glycol diacrylate)", Macromolecules, 39:3568-3580 (2006).

* cited by examiner

*Primary Examiner* — Jason M Greene
*Assistant Examiner* — Anthony Shumate
(74) *Attorney, Agent, or Firm* — Morgan, Lewis & Bockius LLP

(57) ABSTRACT

The present invention relates to a membrane wherein said membrane comprises a continuous non-porous layer comprising a polymerized composition that comprised prior to polymerization at least one type of compound having a molecular weight of at least 1500 Da and comprising at least 75 weight % of oxyethylene groups and at least two polymerizable groups each comprising a non-substituted vinyl group. The invention further relates to the use of this membrane for separating polar gases and vapors.

21 Claims, No Drawings

MEMBRANE COMPRISING OXYETHYLENE GROUPS

This application is a 371 filing based on PCT/NL2008/050310 filed May 26, 2008 and claiming priority from European Application No. 07108822.3, filed May 24, 2007.

FIELD OF THE INVENTION

This invention relates to membranes that may be obtained by polymerizing compounds comprising oxyethylene groups. The membranes are particularly useful for performing gas separation. The invention also relates to processes for preparing said membranes, as well as to their use.

BACKGROUND OF THE INVENTION

For purifying gaseous mixtures e.g. natural gas and flue gas, separating undesired components from the main stream can in some cases be achieved based on the relative size of the components (size-sieving). Sometimes better results can be achieved by making use of the properties of the components to be separated. For example, U.S. Pat. No. 4,963,165 describes the separation of polar from non-polar components using membranes made from polyamide-polyether block copolymers which do not appear to be crosslinked. Polyethylene oxide (PEO) based membranes have been described as suitable for separating $CO_2$ from hydrogen and methane (Lin et al., Macromolecules, Vol. 38, no. 20, 2005, 8394-8407). JP8024602A and JP8024603A describe gas separation membranes containing a polyalkylene glycol di(meth)acrylate having 1-24 alkylene glycol repeating units. Hirayama et al, Journal of Membrane Science, 160, (1999), 87-99, describe polymer films made from polyethylene glycol mono- and di-methacrylates and their application for gas separation. JP7060079 describes plasma treated films having a hydrophilic surface comprising oxyethylene groups preferably having 2-30 repeating units. U.S. Pat. No. 5,069,926 describes porous ultrafiltration membranes suitable for the separation of oil and water which have been surface modified with plasma- or ozone-treated polyethylene glycol diacrylates. WO-A-2005/097304 describes membrane stacks comprising macroporous gel-filled membranes wherein polyethylene glycol diacrylates are used as cross-linkers.

There is a need for membranes having high permeability and selectivity for desired gases that are strong and flexible. Ideally such membranes can be produced efficiently at high speeds using toxicologically acceptable liquids (particularly water) in the composition. In this manner the membranes of the present invention can be made in a particularly cost effective manner. This invention aims at achieving these targets, at least in part.

SUMMARY OF THE INVENTION

It is thus an object of the present invention to provide a membrane having good permeation characteristics, in particular for polar gases and vapors, and that can be produced in an efficient manner. It is another object to provide a membrane that is strong and robust that does not crack easily upon handling.

It has been found that these objects can be met by a membrane made by polymerizing a composition comprising a compound having a molecular weight of at least 1500 Da and comprising at least 75 weight % of oxyethylene —($-CH_2-CH_2-O-$)— groups and furthermore comprising at least two polymerizable groups each comprising a non-substituted vinyl group. Thus, in one aspect, the present invention is directed to a membrane comprising the polymerization product of a compound, which compound has a molecular weight of at least 1500 Da and comprises at least 75 weight % of oxyethylene groups and at least two polymerizable groups, each polymerizable group comprising a non-substituted vinyl group. For convenience the compound comprising at least 75 weight % of oxyethylene groups and at least two vinyl groups is often referred to in this description as "the crosslinkable monomer".

DETAILED DESCRIPTION

It is an object of this invention to provide a membrane that has a high permeability to polar gases such as $CO_2$, $H_2S$, $NH_3$, $SO_x$, and nitrogen oxides, especially NO and a high selectivity for these polar gases over non-polar gases, vapors and liquids. The gases may comprise vapors, for example water vapor. In one embodiment the membrane is not permeable to liquids, e.g. water and aqueous solutions.

Such a gas separation membrane can be applied for purifying natural gas (a mixture which predominantly comprises methane) by removing polar gases ($CO_2$, $H_2S$), for removing $CO_2$ from hydrogen and from flue gases. Flue gas is typically a gas that exits to the atmosphere via a flue, which is a pipe or channel for conveying exhaust gases from e.g. a fireplace, oven, furnace, boiler, combustion engine or steam generator. Particularly, it refers to the combustion exhaust gas produced at power plants. Its composition depends on what is being burned, but it will usually contain mostly nitrogen (typically more than two-thirds) derived from the combustion air, carbon dioxide ($CO_2$) and water vapor as well as excess oxygen (also derived from the combustion air). It further contains a small percentage of pollutants such as particulate matter, carbon monoxide, nitrogen oxides and sulfur oxides. Recently the separation and capture of $CO_2$ has attracted attention in relation to environmental issues (global warming). For some customers and in some applications the cost of the membranes are an important consideration.

The membrane of the invention is made by polymerization of a composition comprising a compound having a molecular weight of at least 1500 Da and comprising at least 75 weight % of oxyethylene groups. While not wishing to be limited by any particular theory, we believe the numerous oxyethylene groups interact with polar molecules such as $CO_2$ very differently from non-polar molecules such as $N_2$, which makes them suitable for enhancing selectivity for polar over non-polar molecules. An oxyethylene group may be drawn out in full as —($-CH_2-CH_2-O-$)—.

A higher content of oxyethylene groups improves the permeability to polar gases. Surprisingly not only permeability and selectivity improve with a high content of oxyethylene groups and high molecular weight but also the physical strength of the resulting membrane is significantly better. Membranes made from polymerizable compounds having a low content of oxyethylene groups and low molecular weight appear to be brittle and break easily when bended during handling. This is especially important when the membrane is used without support. But also attached to a porous support a flexible structure is desired to reduce the risk of cracking of the membrane.

Preferably the polymerization is performed by a process comprising application of the composition to a substrate, e.g. to form a thin layer thereon, and polymerizing the crosslinkable monomer(s) to provide the membrane in the form of a polymer film on the substrate. In this way a membrane may be produced at low cost and at a high production rate (high application/coating speeds). In one embodiment the substrate is a non-porous substrate. In this embodiment the resultant membrane preferably is removed from the substrate after polymerization. In another embodiment the substrate is porous and the resultant membrane and porous substrate preferably remain in contact. The latter alternative can be very useful for providing membranes with greater mechanical strength and the process for making such supported membranes is particularly efficient and convenient.

Optionally the process further comprises the step of washing and/or drying the membrane after polymerization.

Lin et al. (Macromolecules 38 (2005) 8381-8407, 9679-9687) describe PEG containing polymers with polymerizable groups vinyl groups, which polymers have a molecular weight of 743 Da. Similar polymers are described in Lin et al. (Journal of Membrane Science 276 (2006) 145-161); Lin et al. (Macromolecules 39 (2006) 3568-3580; and Lin et al. (Advanced Materials 18 (2006) 39-44). Although in these publications studies are reported on the permeability properties of membranes produced from these polymers, there is no disclosure or suggestion that the physical strength can be improved considerably by preparing a membrane comprising a polymer having the specific chemical composition of the present invention. In particular, these prior art documents are silent with respect to the content of oxyethylene groups and molecular weight of polymerizable compounds on the membrane's physical characteristics.

For a membrane to be effective as separation membrane the size of the pores should in general be smaller than the dimensions of the compounds to be separated. For separation of small gaseous molecules the membrane is substantially non-porous, which means that its pore sizes preferably do not exceed the radius of the molecule to be rejected. A suitable method to determine the pore size is observation by scanning electron microscope (SEM). Substantially non-porous means that no pores are detected by SEM (using a Jeol JSM-6335F Field Emission SEM, applying an accelerating voltage of 2 kV, working distance 4 mm, aperture 4, sample coated with Pt with a thickness of 1.5 nm, magnification 100 000×, 3° tilted view). Preferably the membrane has an average pore size of below 10 nm, more preferably below 5 nm, especially below 2 nm. The maximum preferred pore size depends on the application e.g. on the compounds to be separated. Another method to obtain an indication of the actual porosity is the permeance to liquids such as water. Preferably the permeance to liquids is very low, i.e. the average pore size of the membrane is such that the pure water permeance at 20° C. is less than $6.10^{-8}$ $m^3/m^2 \cdot s \cdot kPa$, more preferably less than $3.10^{-8}$ $m^2 \cdot s \cdot kPa$.

The composition optionally comprises one of the crosslinkable monomers or it may contain more than one of the crosslinkable monomers, optionally other compounds that may copolymerize therewith. These other compounds include higher oxyalkylenes, such as oxypropylenes and oxybutylenes, and may be present in the composition although low amounts of such polymerizable higher oxyalkylenes are preferred (e.g 0 to 10 weight % relative to the polymerizable composition) because of their less hydrophilic character, their higher price and their more limited commercial availability.

For the final membrane linear polymers containing oxyethylene segments are not suited as such since they may partly or totally dissolve in contact with liquids or vapors causing permanent damage to the membrane. To reduce the tendency to dissolve in contact with liquids or vapors it was found that a crosslinked structure is required. Suitable crosslinking groups are ethylenically unsaturated groups that can be described by the formula CH=CH— (also known as vinyl group, which is not substituted). For making a network structure at least two crosslinkable groups per molecule should be present. Examples of suitable vinyl groups are acrylate groups, acrylamide groups, vinyl ether groups, vinyl ester groups, vinyl amide groups, allyl ether groups, allyl ester groups, allyl amine groups, allyl amide groups, styryl groups, and combinations thereof. The preferred vinyl groups are acrylic ($CH_2$=CHC(O)—) groups, especially acrylate ($CH_2$=CHC(O)O—) groups. Acrylate groups are preferred because of their fast polymerization rates, especially when using UV light to effect the polymerization, and better commercial availability.

The vinyl group is not substituted. Polymers of substituted vinyl monomers have a lower oxyethylene content than polymers of non-substituted vinyl monomers, resulting in a lower permeability and possibly lower selectivity for polar gases/vapors. It is known that in general substituted vinyl monomers are less reactive than non-substituted vinyl monomers due to steric hindrance, which will result in slower polymerization. For high speed production methods fast polymerization is desired. In case substituted vinyl groups are used a high energy polymerization method is preferred such as electron beam irradiation of plasma treatment. Even with these methods unsubstituted vinyl monomers are preferred.

The network structure is determined to a large extent by the content of multifunctional monomers having two or more crosslinkable groups and by the distance between these crosslinkable groups. A high content of di-, tri- or tetrafunctional monomers will result is a rigid structure. For a good performance a rigid structure is generally not desired: the permeability is restricted. A more loose matrix can be achieved by limiting the content of multifunctional monomers and increasing the content of monofunctional monomers. Monofunctional monomers are polymerizable and will be incorporated in the network structure but cannot form crosslinks. A low content of multifunctional monomers (e.g. less than 3 weight %) will result in a loose structure which is not preferred because it has a negative effect on the selectivity. Also the efficiency of the crosslinking reaction decreases, making a longer reaction time necessary with more strict reaction conditions e.g. reaction under an inert atmosphere. A more preferred method to achieve a low crosslink density is to increase the distance between the crosslinkable groups by applying high molar weight (MW) monomers, wherein in the case of difunctional monomers the crosslinkable groups are preferably located on the ends of the (linear) molecule. The molecular weight of the crosslinkable monomer is preferably at least 1500 Da, more preferably at least 1600 Da. Molecular weights as high as 20, 40 or even 60 kDa or more may be used. A practical higher limit is formed by the viscosity of the composition comprising the polymerizable compound which is preferably less than 4000 mPa·s at 35° C. Preferably the molecular weight of the polymerizable compound is lower than 100 kDa.

The oxyethylene groups in the polymerizable compound may form an uninterrupted chain of such groups (e.g. as in —($CH_2CH_2O$)$_n$— wherein n is at least 25) or the chain may contain interruptions as —($CH_2CH_2O$)$_{n-q}$—R—(O$CH_2$ $CH_2$)$_q$— (wherein q is 1 to n−1). Examples of such interruptions (R) include —$CH_2$—, —($CH_2$)$_x$— wherein x>2, —CH ($CH_3$)—, —C($CH_3$)$_2$—, —$CH_2$—C($CH_3$)$_2$—$CH_2$—, —$C_6H_4$—, —$C_6H_4$—C($CH_3$)$_2$—$C_6H_4$— (bisphenol A), —(C=O)—. Preferably, at least two vinyl groups are separated by at least 5, more preferably at least 15 or 25 oxyethylene groups.

A high oxyethylene content is preferred because it enhances the solubility of carbon dioxide in the matrix due to its hydrophilic character and thereby improves the permeability. Preferably at least 75 weight %, more preferably at least 80 weight % of oxyethylene groups are present in the crosslinkable monomer. For some embodiments even more than 90 weight % of oxyethylene groups is preferred. Preferably at most 99.85 weight % of the crosslinkable monomer is oxyethylene groups. There is no limitation to the maximum number of oxyethylene groups between two crosslinkable groups, but crystallization of the poly-oxyethylene chain under the conditions the membrane is used should be prevented as much as possible, because in crystallized form the flux is severely reduced. Membranes with matrices crystallizing at or below room temperature can be used without such negative effects on the flux for high temperature applications, like separation of flue gas or water vapor, etc. Using structures comprising one or more non-oxyethylene groups may be effective in preventing crystallization. In the final structure other compounds may be incorporated in the polymer film and therefore the overall oxyethylene content may be lower than in the crosslinkable monomer. Preferably oxyethylene segments constitute at least 50 weight % of the polymer film, more preferably at least 60 weight %, even more preferably at least 75 weight % or even at least 80 weight %. Preferred upper limit for the content of oxyethylene groups in the membrane is 98 weight % or 95 weight %.

In general, a combination of several types of monomers is preferred. For instance with a mixture of difunctional crosslinkable monomers and monofunctional monomers good results can be obtained. Alternatively higher functional monomers may be used but usually in low amounts since high amounts would result in a high crosslinking density and a rigid structure. Preferably the composition comprises between 0 and 10 weight % of higher functional monomers (e.g. having 3 or more crosslinkable groups), more preferably between 0 and 5 weight %. The composition to be polymerized preferably comprises between 3 and 80 weight % of crosslinkable monomer and may further comprise monofunctional monomers, different kinds of additives and solvents. More preferably the composition comprises between 5 and 60 weight %, even more preferably between 10 and 50 weight % of crosslinkable monomer. More than one type of crosslinkable monomer may be used.

Suitable crosslinkable monomers can be described according the following general formulae:

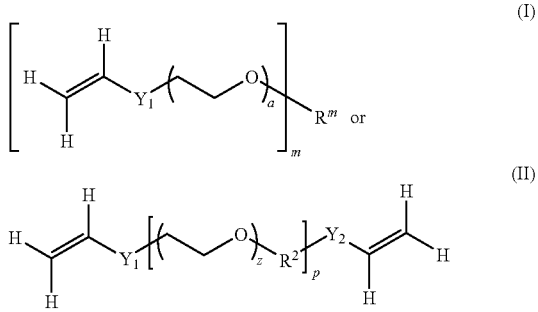

wherein
a is at least 1 and less than 1100, preferably more than 25/m, more preferably at least 30/m.
z is at least 1 and less than 1100, preferably more than 25/p, more preferably at least 30/p.
m is 2-6, preferably 2.
p is at least 1 and less than 500, preferably between 1 and 100.

$R^m$ is a polyvalent radical corresponding to m: $R^2$ (m=2), $R^3$ (m=3), $R^4$ (m=4), $R^5$ (m=5), $R^6$ (m=6).
$R^2$ is $R^{21}$ or $R^{22}$, where $R^{21}$ is for example alkylene group —$(CH_2)_x$—, —$C(CH_3)_2$—, —$CH_2$—$C(CH_3)_2$—$CH_2$—, —$C_6H_4$—, —$C_6HR^1_3$—, —$C_6H_2R^1_2$—, —$C_6H_3R^1$—, —$C_6R^1_4$—, —$C_6H_4$—$CH_2$—$C_6H_4$—, —$C_6H_4$—CH($CH_3$)—$C_6H_4$—, —$C_6H_4$—$C(CH_3)_2$—$C_6H_4$—, or polyalkylene glycol (e.g. poly(propylene glycol, poly(butylene glycol), poly(trimethylene glycol), poly(tetramethylene glycol)).
$R^{22}$ is for example a carbonyl group —C(=O)— or dicarboxylic group of formula: —C(=O)—$R^{21}$—C(=O)—, dicarbamate group of formula: —C(=O)—NH—$R^{21}$—NH—C(=O)—, or biscarbonate group of formula: —C(=O)—O—$R^{21}$—O—C(=O)—.
wherein x is 1-10 and $R^1$ is H, or an alkyl group of $C_1$-$C_{10}$, or an aromatic group, or an alkoxy group, or an ester group.

Examples of $R^3$:

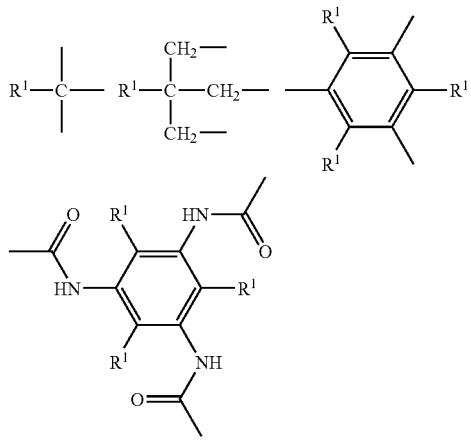

Examples of $R^4$:

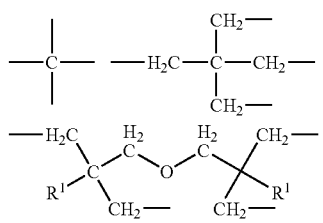

Example of $R^6$:

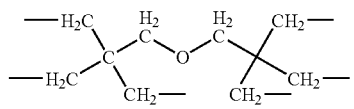

$Y_1$— and $Y_2$— are for example —(C=O)—O—, —C(=O)—O—$(CH_2)_x$—O—, —C(=O)—$NR^1$ —$(CH_2)_x$—O—, —C(=O)—$OCH_2$—CH(OH)— $CH_2O$—, —C(=O)—$OCH_2$—CH(OH)—$CH_2NR^1$, —$C_6H_4$—, $CH_2$=CH—O—, —O—C(=O)—$(CH_2)_x$— O—, —S—, —$NR^1$—, —NH—C(=O)—$(CH_2)_x$—O—, —$CH_2$—O—, —$CH_2$—O—C(=O)—$(CH_2)_x$—O—, —$CH_2$—NH—C(=O)—$(CH_2)_x$—O—, —$SiR^1_3$—, —$CH_2$—$SiR^1_3$—.

wherein x is 1-10 and $R^1$ is H, or an alkyl group of $C_1$-$C_{10}$, or an aromatic group, or an alkoxy group, or an ester group.

Total number of oxyethylene segment in the molecule
$n=z*m$ or $n=z*p$.

Examples of specific compounds include: Poly(ethylene glycol) diacrylate, Poly(ethylene glycol) divinyl ether, Poly(ethylene glycol) diallyl ether, Bisphenol A ethoxylate diacrylate, neopentyl glycol ethoxylate diacrylate, propanediol ethoxylate diacrylate, butanediol ethoxylate diacrylate, hexanediol ethoxylate diacrylate, poly(ethylene glycol-co-propylene glycol) diacrylate, Poly(ethylene glycol)-block-poly(propylene glycol)-block-poly(ethylene glycol) diacrylate, Glycerol ethoxylate triacrylate, trimethylolpropane ethoxylate triacrylate, trimethylolpropane ethoxylate triacrylate, pentaerythrytol ethoxylate tetraacrylate, ditrimethylolpropane ethoxylate tetraacrylate, dipentaerythrytol ethoxylate hexaacrylate.

In general, the preferred composition comprises copolymerization of the polymerizable compound with one or more other ethylenically unsaturated compounds. For instance, copolymerization of the polymerizable compound with monofunctional monomers (i.e. compounds having 1 ethylenically unsaturated group) can give good results, a higher permeability can be obtained. Preferably these other ethylenically unsaturated compounds also comprise a high number of oxyethylene groups, e.g. at least 25 oxyethylene groups. Alternatively higher functional monomers may be used but usually in low amounts to prevent a too high crosslink density.

Examples of compounds having one (and only one) ethylenically unsaturated groups include alkyl(meth)acrylates, (meth)acrylic acid, (meth)acrylamide, (meth)acrylonitrile, vinyl pyridine, vinyl pyrrolidone, vinylacetate, and poly(ethylene glycol) (meth)acrylate of following structure, wherein w is 1-100 and $R^{11}$ is H, or an alkyl group of $C_1$-$C_{10}$, or an aromatic group, or an alkoxy group, or an ester group, $R^{12}$ is H or a methyl group.

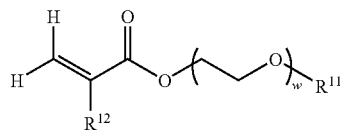

In general the dry thickness of the membrane of this invention in isolated form may typically be between 20 μm and 300 μm, more preferably between 30 and 200 μm. When joined to a support the membrane need not give internal strength and the optimal thickness is based on properties such as permeability and uniformity. In the latter case the dry thickness of the membrane layer is typically between 0.05 and 10 μm, more preferably between 0.05 and 2 μm. The permeance to gases and vapors is directly related to the thickness of the membrane layer, so a layer as thin as possible is preferred. On the other hand the layer should be uniform without defects such as pinholes that would deteriorate the selectivity.

The crosslinkable monomers comprising at least 75 weight % of oxyethylene groups are preferably well soluble in polar solvents such as water. For reasons of safety, health and the environment, as well as from economic viewpoint, water is the most preferred solvent.

Typically the solvent comprises water and optionally one or more organic solvents, especially water-miscible organic solvent(s). As examples of water-miscible organic solvents there may be mentioned: $C_{1-6}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cyclohexanone and diacetone alcohol; water-miscible ethers, preferably tetrahydrofuran and dioxane; diols, preferably diols having from 2 to 12 carbon atoms, for example pentane-1,5-diol, ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)-ethoxy]-ethanol and ethyleneglycol monoallylether; cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulphoxides, preferably dimethyl sulphoxide and sulpholane.

In case a solvent is used in the composition, the solvent is chosen so that a stable and homogeneous solution is formed which does not phase separate upon polymerization of the polymerizable compound.

The polymerizable compound mixture is preferably subjected to radiation to effect polymerization. In principle (electromagnetic) radiation of any suitable wavelength can be used, such as for example ultraviolet, visible or infrared radiation, as long as it matches the absorption spectrum of the photo-initiator, if present, or as long as enough energy is provided to directly polymerize (or cure) the polymerizable compound without the need of a photo-initiator. Electron beam radiation may also be used. The terms curing and polymerization are used interchangeably throughout this document.

Curing by infrared radiation is also known as thermal curing. Thus polymerization may be effectuated by combining the monomers with ethylenically unsaturated groups with a thermally reactive free radical initiator and heating the mixture. Exemplary thermally reactive free radical initiators are organic peroxides such as ethyl peroxide and benzyl peroxide; hydroperoxides such as methyl hydroperoxide, acyloins such as benzoin; certain azo compounds such as α,α'-azobisisobutyronitrile and γ,γ'-azobis(γ-cyanovaleric acid); persulfates; peracetates such as methyl peracetate and tert-butyl peracetate; peroxalates such as dimethyl peroxalate and di(tert-butyl) peroxalate; disulfides such as dimethyl thiuram disulfide and ketone peroxides such as methyl ethyl ketone peroxide. Temperatures in the range of from about 30° C. to about 150° C. are generally employed. More often, temperatures in the range of from about 40° C. to about 110° C. are used.

Of all the abovementioned methods of polymerisation the use of ultraviolet light is preferred. Suitable wavelengths are for instance UV-A (400-320 nm), UV-B (320-280 nm), UV-C (280-200 nm), provided the wavelength matches with the absorbing wavelength of the photo-initiator, if present.

Suitable sources of ultraviolet light are mercury arc lamps, carbon arc lamps, low pressure mercury lamps, medium pressure mercury lamps, high pressure mercury lamps, swirlflow plasma arc lamps, metal halide lamps, xenon lamps, tungsten lamps, halogen lamps, lasers and ultraviolet light emitting diodes. Particularly preferred are ultraviolet light emitting lamps of the medium or high pressure mercury vapor type. In addition, additives such as metal halides may be present to modify the emission spectrum of the lamp. In most cases lamps with emission maxima between 200 and 450 nm are most suitable.

The energy output of the exposing device may be between 20 and 1000 W/cm, preferably between 40 and 500 W/cm but may be higher or lower as long as the desired exposure dose can be realized. The exposure intensity is one of the parameters that can be used to control the extent of curing which influences the final structure of the membrane. Preferably the exposure dose is at least 40 mJ/cm$^2$, more preferably between 40 and 600 mJ/cm$^2$, most preferably between 70 and 220 mJ/cm$^2$ as measured by an High Energy UV Radiometer (UV Power Puck™ from EIT—Instrument Markets) in the UV-B range indicated by the apparatus. Exposure times can be chosen freely but preferably are short and are typically less than 5 seconds, preferably less than 2 seconds, e.g. less than 1 second. For determining exposure time only the direct radiation including the radiation reflected by the mirror of the exposure unit is taken into account, not the indirect stray light.

Photo-initiators may be used in accordance with the present invention and can be mixed into the mixture of the polymerizable compound(s). Photo-initiators are usually required when the coated mixture is cured by UV or visible light radiation. Suitable photo-initiators are those known in the art such as radical type, cation type or anion type photo-initiators.

Examples of radical type I photo-initiators are α-hydroxy-alkylketones, such as 2-hydroxy-1-[4-(2-hydroxyethoxy) phenyl]-2-methyl-1-propanone (Irgacure™ 2959: Ciba), 2-hydroxy-1-[4-(2-hydroxypropoxy)phenyl]-2-methyl-1-propanone (Omnirad™ 669: Ciba), 1-hydroxy-cyclohexyl-phenylketone (Irgacure™ 184: Ciba), 2-hydroxy-2-methyl-1-phenyl-1-propanone (Sarcure™ SR1173: Sartomer, Additol™ HDMAP: Surface Specialties), oligo[2-hydroxy-2-methyl-1-{4-(1-methylvinyl)phenyl}propanone] (Sarcure™ SR1130: Sartomer), 2-hydroxy-2-methyl-1-(4-tert-butyl-)phenylpropan-1-one, 2-hydroxy-[4'-(2-hydroxypropoxy)phenyl]-2-methylpropan-1-one, 1-(4-Isopropylphenyl)-2-hydroxy-2-methyl-propanone (Darcure™ 1116: Ciba); α-aminoalkylphenones such as 2-benzyl-2-(dimethylamino)-4'-morpholinobutyrophenone (Irgacure™ 369: Ciba), 2-methyl-4'-(methylthio)-2-morpholinopropiophenone (Irgacure™ 907: Ciba); α,α-dialkoxyacetophenones such as α,α-dimethoxy-α-phenylacetophenone (Irgacure™ 651: Ciba), 2,2-diethoxy-1,2-diphenylethanone (Uvatone™ 8302: Upjohn), α,α-diethoxyacetophenone (DEAP: Rahn), α,α-di-(n-butoxy) acetophenone (Uvatone™ 8301: Upjohn); phenylglyoxolates such as methylbenzoylformate (Darocure™ MBF: Ciba); benzoin derivatives such as benzoin (Esacure™ BO: Lamberti), benzoin alkyl ethers (ethyl, isopropyl, n-butyl, isobutyl, etc.), benzylbenzoin benzyl ethers, Anisoin; mono- and bis-Acylphosphine oxides, such as 2,4,6-trimethylbenzoyl-diphenylphosphine oxide (Lucirin™ TPO: BASF), ethyl-2,4,6-trimethylbenzoylphenylphosphinate (Lucirin™ TPO-L: BASF), bis(2,4,6-trimethylbenzoyl)-phenylphosphine oxide (Irgacure™ 819: Ciba), bis(2,6-dimethoxybenzoyl)-2,4,4-trimethyl-pentylphosphineoxide (Irgacure™ 1800 or 1870). Other commercially available photo-initiators are 1-[4-(phenylthio)-2-(O-benzoyloxime)]-1,2-octanedione (Irgacure™ OXE01), 1-[9-ethyl-6-(2-methylbenzoyl)-9H-carbazol-3-yl]-1-(O-acetyloxime)ethanone (Irgacure™ OXE02), 2-hydroxy-1-{4-[4-(2-hydroxy-2-methyl-propionyl)-benzyl]-phenyl}-2-methyl-propan-1-one (Irgacure™ 127), oxy-phenyl-acetic acid 2-[2 oxo-2-phenyl-acetoxy-ethoxy]-ethyl ester (Irgacure™ 754), oxy-phenyl-acetic-2-[2-hydroxy-ethoxy]-ethyl ester (Irgacure™ 754), 2-(dimethylamino)-2-(4-methylbenzyl)-1-[4-(4-morpholinyl)phenyl]-1-butanone (Irgacure™ 379), 1-[4-[4-benzoylphenyl)thio]phenyl]-2-methyl-2-[(4-methylphenyl)sulfonyl)]-1-propanone (Esacure™ 1001M from Lamberti), 2,2'-bis(2-chlorophenyl)-4,4',5,5'-tetraphenyl-1,2'-bisimidazole (Omnirad™ BCIM from IGM).

Examples of type II photo-initiators are benzophenone derivatives such as benzophenone (Additol™ BP: UCB), 4-hydroxybenzophenone, 3-hydroxybenzophenone, 4,4'-dihydroxybenzophenone, 2,4,6-trimethylbenzophenone, 2-methylbenzophenone, 3-methylbenzophenone, 4-methylbenzophenone, 2,5-dimethylbenzophenone, 3,4-dimethylbenzophenone, 4-(dimethylamino)benzophenone, [4-(4-methylphenylthio)phenyl]phenylmethanone, 3,3'-dimethyl-4-methoxy benzophenone, methyl-2-benzoylbenzoate, 4-phenylbenzophenone, 4,4-bis(dimethylamino)benzophenone, 4,4-bis(diethylamino)benzophenone, 4,4-bis(ethylmethylamino)benzophenone, 4-benzoyl-N,N,N-trimethylbenzenemethanaminium chloride, 2-hydroxy-3-(4-benzoylphenoxy)-N,N,N-trimethyl-1-propanamium chloride, 4-(13-Acryloyl-1,4,7,10,13-pentaoxatridecyl)benzophenone (Uvecryl™ P36: UCB), 4-benzoyl-N,N-dimethyl-N-[2-(1-oxo-2-propenyl)oy]ethylbenzenemethanaminium chloride, 4-benzoyl-4'-methyldiphenyl sulphide, anthraquinone, ethylanthraquinone, anthraquinone-2-sulfonic acid sodium salt, dibenzosuberenone; acetophenone derivatives such as acetophenone, 4'-phenoxyacetophenone, 4'-hydroxyacetophenone, 3'-hydroxyacetophenone, 3'ethoxyacetophenone; thioxanthenone derivatives such as thioxanthenone, 2-chlorothioxanthenone, 4-chlorothioxanthenone, 2-isopropylthioxanthenone, 4-isopropylthioxanthenone, 2,4-dimethylthioxanthenone, 2,4-diethylthioxanthenone, 2-hydroxy-3-(3,4-dimethyl-9-oxo-9H-thioxanthon-2-yloxy)-N,N,N-trimethyl-1-propanaminium chloride (Kayacure™ QTX: Nippon Kayaku); diones such as benzyl, camphorquinone, 4,4'-dimethylbenzyl, phenanthrenequinone, phenylpropanedione; dimethylanilines such as 4,4',4''-methylidyne-tris(N,N-dimethylaniline) (Omnirad™ LCV from IGM); imidazole derivatives such as 2,2'-bis(2-chlorophenyl)-4,4',5,5'-tetraphenyl-1,2'-bisimidazole; titanocenes such as bis(eta-5-2,4-cyclopentadiene-1-yl)-bis-[2,6-difluoro-3-1H-pyrrol-1-yl]phenyl]titanium (Irgacure™784: Ciba); iodonium salt such as iodonium, (4-methylphenyl)-[4-(2-methylpropyl-phenyl)-hexafluorophosphate (1-). If desired combinations of photo-initiators may also be used.

For acrylates, diacrylates, triacrylates or multifunctional acrylates, type I photo-initiators are preferred. Especially alpha-hydroxyalkylphenones, such as 2-hydroxy-2-methyl-1-phenyl propan-1-one, 2-hydroxy-2-methyl-1-(4-tert-butyl-) phenylpropan-1-one, 2-hydroxy-[4'-(2-hydroxypropoxy)phenyl]-2-methylpropan-1-one, 2-hydroxy-1-[4-(2-hydroxyethoxy)phenyl]-2-methyl propan-1-one, 1-hydroxycyclohexylphenylketone and oligo[2-hydroxy-2-methyl-1-{4-(1-methylvinyl)phenyl}propanone], alpha-aminoalkylphenones, alpha-sulfonylalkylphenones and acylphosphine oxides such as 2,4,6-trimethylbenzoyl-diphenylphosphine oxide, ethyl-2,4,6-trimethylbenzoyl-phenylphosphinate and bis(2,4,6-trimethylbenzoyl)-phenylphosphine oxide, are preferred. Preferably the ratio of photo-initiator and polymerizable compound(s) is between 0.001 and 0.1, more preferably between 0.005 and 0.05, based on weight. It is preferred to minimize the amount of photo-initiator used, in other words preferably all photo-initiator has reacted after the curing step (or curing steps). Remaining photo-initiator may have adverse effects and when applied as a separation membrane excessive washing may be required to wash out remaining photo-initiator. A single type of photo-initiator may be used but also a combination of several different types.

In the case UV radiation is used a UV light source can be selected having emissions at several wavelengths. The combination of UV light source and photo-initiator(s) can be optimized so that sufficient radiation penetrates deep into the layer(s) to activate the photo-initiators. A typical example is an H-bulb with an output of 600 Watts/inch (240 W/cm) as supplied by Fusion UV Systems which has emission maxima around 220 nm, 255 nm, 300 nm, 310 nm, 365 nm, 405 nm, 435 nm, 550 nm and 580 nm. Alternatives are the V-bulb and the D-bulb which have a different emission spectrum, with main emissions between 350 and 450 nm and above 400 nm respectively. Preferably the UV light source and the photo-initiators are chosen such that the wavelength of the UV light provided corresponds to the absorption of the photo initiator(s). From a choice of light sources and photo-initiators optimal combinations can be made. Applying multiple types of photo-initiator allows for thicker layers to be cured efficiently with the same intensity of irradiation.

In case no photo-initiator is added, the polymerizable compound can be advantageously cured by electron-beam exposure as is known in the art. Preferably the output is between 50 and 300 keV. Curing can also be achieved by plasma or corona exposure.

Curing rates may be increased by adding amine synergists to the polymerizable compound. Amine synergists are known to enhance reactivity and retard oxygen inhibition. Suitable amine synergists are e.g. free alkyl amines such as triethylamine, methyldiethanol amine, triethanol amine; aromatic amine such as 2-ethylhexyl-4-dimethylaminobenzoate, ethyl-4-dimethylaminobenzoate and also polymeric amines as polyallylamine and its derivatives. Curable amine synergists such as ethylenically unsaturated amines (e.g. (meth) acrylated amines) are preferable since their use will give less odor due to its ability to be incorporated into the polymeric matrix by curing. The amount of amine synergists is preferably from 0.1-10 wt. % based on the weight of polymerizable compounds in the polymerizable composition, more preferably from 0.3-3 wt. % based on the weight of polymerizable compounds.

Where desired, a surfactant or combination of surfactants may be added to the polymerizable composition as a wetting agent or to adjust surface tension. Commercially available surfactants may be utilized, including radiation-curable surfactants. Surfactants suitable for use in the polymerizable composition include nonionic surfactants, ionic surfactants, amphoteric surfactants and combinations thereof. Preferred nonionic surfactants include ethoxylated alkylphenols, ethoxylated fatty alcohols, ethylene oxide/propylene oxide block copolymers, fluoroalkyl ethers, and the like. Preferred ionic surfactants include, but are not limited to, the following: alkyltrimethylammonium salts wherein the alkyl group typically contains from 8 to 22 (preferably 12 to 18) carbon atoms; alkylbenzyldimethylammonium salts wherein the alkyl group typically contains from 8 to 22 (preferably 12 to 18) carbon atoms, and ethylsulfate; and alkylpyridinium salts wherein the alkyl group typically contains from 8 to 22 (preferably 12 to 18) carbon atoms. Surfactants may be for instance fluorine based or silicon based. Examples of suitable fluorosurfactants are: fluoro $C_2$-$C_{20}$ alkylcarboxylic acids and salts thereof, disodium N-perfluorooctanesulfonyl glutamate, sodium 3-(fluoro-$C_6$-$C_{11}$ alkyloxy)-1-$C_3$-$C_4$ alkyl sulfonates, sodium 3-(omega-fluoro-$C_6$-$C_8$ alkanoyl-N-ethylamino)-1-propane sulfonates, N-[3-(perfluorooctanesulfonamide)-propyl]-N,N-dimethyl-N-carboxymethylene ammonium betaine, perfluoro alkyl carboxylic acids (e.g. $C_7$-$C_{13}$-alkyl carboxylic acids) and salts thereof, perfluorooctane sulfonic acid diethanolamide, Li, K and Na perfluoro $C_4$-$C_{12}$ alkyl sulfonates, Li, K and Na N-perfluoro $C_4$-$C_{13}$ alkane sulfonyl-N-alkyl glycine, fluorosurfactants commercially available under the name Zonyl® (produced by E.I. Du Pont) that have the chemical structure of $RfCH_2CH_2SCH_2CH_2CO_2Li$ or $RfCH_2CH_2O(CH_2CH_2O)_xH$ wherein $Rf=F(CF_2CF_2)_{3-8}$ and x=0 to 25, N-propyl-N-(2-hydroxyethyl)perfluorooctane sulfonamide, 2-sulfo-1,4-bis(fluoroalkyl)butanedioate, 1,4-bis(fluoroalkyl)-2-[2-N,N,N-trialkylammonium)alkyl amino] butanedioate, perfluoro $C_6$-$C_{10}$ alkylsulfonamide propyl sulfonyl glycinates, bis-(N-perfluorooctylsulfonyl-N-ethanolaminoethyl)phosphonate, mono-perfluoro $C_6$-$C_{16}$ alkyl-ethyl phosphonates, and perfluoroalkylbetaine. Also useful are the fluorocarbon surfactants described e.g. in U.S. Pat. No. 4,781, 985 and in U.S. Pat. No. 5,084,340.

Silicon based surfactants are preferably polysiloxanes such as polysiloxane-polyoxyalkylene copolymers. Such copolymers may be for example dimethylsiloxane-methyl (polyoxyethylene) copolymer, dimethylsiloxane-methyl (polyoxyethylene-polyoxypropylene) siloxane copolymer, trisiloxane alkoxylate as a copolymer of trisiloxane and polyether, and siloxane propoxylate as a copolymer of siloxane and polypropylene oxide. The siloxane copolymer surfactants may be prepared by any method known to those having skill in the art and can be prepared as random, alternate, block, or graft copolymers. The polyether siloxane copolymer preferably has a weight-average molecular weight in a range of 100 to 10,000. Examples of polyether siloxane copolymers commercially available in the market include SILWET® DA series, such as SILWET® 408, 560 or 806, SILWET® L series such as SILWET-7602® or COATSIL® series such as COATSIL® 1211, manufactured by CK WITCO; KF351A, KF353A, KF354A, KF618, KF945A, KF352A, KF615A, KF6008, KF6001, KF6013, KF6015, KF6016, KF6017, manufactured by SHIN-ETSU; BYK-019, BYK-300, BYK-301, BYK-302, BYK-306, BYK-307, BYK-310, BYK-315, BYK-320, BYK-325, BYK-330, BYK-333, BYK-331, BYK-335, BYK-341, BYK-344, BYK-345, BYK-346, BYK-348, manufactured by BYK-CHEMIE; and GLIDE™ series such as GLIDE™ 450, FLOW™ series such as FLOW™ 425, WET™ series such as WET™ 265, manufactured by TEGO.

The permeability to gases is influenced by the swellability of the membrane and by plastization. By plastization compounds penetrate the membrane and act as plasticizer. In humid environments water (vapor) may cause the swelling but also impurities in the gas flow such as hydrocarbon compounds, alcohols, etc. may contribute. Too much swelling/plastization may reduce the selectivity for polar gases over non-polar gases and may damage the membrane. The degree of swelling can be controlled by the types and ratio of monomers, the extent of crosslinking (exposure dose, photo-initiator type and amount) and by other ingredients (e.g. chain transfer agents, synergists).

In one embodiment at least two mixtures are coated (simultaneously or consecutively) on a substrate which after polymerization and drying results in a membrane comprising at least one top layer and at least one bottom layer that is closer to the substrate than the top layer. In this embodiment the top layer comprises the membrane of this invention and the bottom layer has a porous structure and gives strength to the membrane. For a two-layer membrane structure the bottom layer preferably has a dry thickness of between 50 and 500 μm, preferably between 70 and 400 μm, most preferably between 100 and 300 μm and the dry thickness of the toplayer is preferably smaller than 10 µm, preferably between 0.05 and 4 µm, most preferably between 0.05 and 1 µm.

Optional additives are polymerizable compounds that comprise one or more functional thiol groups. These compounds then act as chain transfer agents which are known to be less sensitive to oxygen inhibition and whose usage result in a more uniform polymer chain length and crosslink density. Examples of thiol compounds include mercaptoacetic acid, mercaptopropionic acid, alkyl mercaptopropionate, mercapto-propylsulfonate, ethyldithiocarbonato-S-sulfopropylester, dimercaptopropane sulfonate mercaptobenzimidazole sulfonate. Preferred thiol compounds are mercaptoethanol, mercaptoethylether, mercaptobenzimidazole, ethyldithioacetate, butanethiol, and ethylenedioxydiethanethiol. Optimum quantities depend very much on the composition of the crosslinkable composition, on the type of the chain transfer agent (reactivity) and on the irradiation dose so the optimum concentration has to be determined case by case. At high levels of chain transfer agents it was found that adhesion problems may occur if the compound is in the layer adjacent to the support. When a multilayer membrane is made the chain transfer agent is preferably in the toplayer where the effect on surface structure is expected to be the highest. Very high levels may retard the crosslinking reaction too much resulting in a layer that is not completely polymerized and is still wet. Preferably the chain transfer agent is present in an amount between 0.001 and 1.0 mmol/g polymerizable compound. For most compounds the preferred range will be between 0.005 and 0.1 mmol/g polymerizable compound. If the membrane consists of more than one layer the mentioned range apply to the layer or layers comprising the chain transfer agent.

Other additives may be one or more plasticizers, such as (poly)alkylene glycol, glycerol ethers and polymer lattices with low Tg-value and the like and one or more conventional additives, such as acids, pH controllers, preservatives, viscosity modifiers c.q. stabilisers, dispersing agents, inhibitors, antifoam agents, organic/inorganic salts, anionic, cationic, non-ionic and/or amphoteric surfactants and the like in accordance with the objects to be achieved.

The above-mentioned additives (photo-initiators, amine synergists, surfactants, chain transfer agents, plasticizers, conventional additives) may be selected from those known to a person skilled in the art and may be added in a range of preferably from 0 to 10 weight % based on the composition to be polymerized. Any of the components mentioned above may be employed alone or in combination with each other. They may be added after being solubilized in water, dispersed, polymer-dispersed, emulsified or may be converted into oil droplets.

The membrane of the invention may be produced by the following steps:
  Providing a composition comprising a compound having a molecular weight of at least 1500 Da and comprising at least 75 weight % of oxyethylene groups and at least two polymerizable groups each comprising a non-substituted vinyl group;
  Applying the composition to a support;
  Polymerizing said composition thereby forming a non-porous polymer film;
  Optionally washing and/or drying the polymer film.
  Optionally where the support is non-porous to polar gases removing the polymerised composition to form an unsupported membrane.

The polymer film is preferably used as a separation membrane. The support is preferably porous if the polymer film and the support are to be used in combination.

When high intensity UV light is applied for polymerizing and crosslinking the crosslinkable composition heat is generated by the UV lamp(s). In many systems cooling by air is applied to prevent the lamps from becoming overheated. Still a significant dose of IR light is irradiated together with the UV-beam. In one embodiment the heating-up of the coated support is reduced by placing an IR reflecting quartz plate in between the UV lamp(s) and the coated layer that is guided underneath the lamp(s).

As a coating method, any method can be used. For example, curtain coating, extrusion coating, air-knife coating, slide coating, roll coating method, reverse roll coating, dip coating, rod bar coating and spray coating. The coating of multiple layers can be done simultaneously or consecutively, depending on the embodiments used. In order to produce a sufficiently flowable composition for use in a high speed coating machine, it is preferred that the viscosity does not exceed 4000 mPa·s (all viscosities mentioned herein are measured at 35° C., unless indicated otherwise) more preferably that it should not exceed 1000 mPa·s at 35° C. For coating methods such as slide bead coating the preferred viscosity is from 1 to 100 mPa·s. The desired viscosity is preferably achieved by controlling the amount of solvent, preferably water.

With suitable coating techniques coating speeds of at least 15 m/min, e.g. more than 20 m/min or even higher, such as 60 m/min, 120 m/min or more, up to 400 m/min, can be reached. To reach the desired dose at high coating speeds more than one UV lamp may be required, so that the coated layer is exposed to more than one lamp. When two or more lamps are applied all lamps may give an equal dose or each lamp may have an individual setting. For instance the first lamp may give a higher dose than the second and following lamps or the exposure intensity of the first lamp may be lower.

Before applying the coating to the surface of the support material described above this support may be subjected to a corona discharge treatment, glow discharge treatment, flame treatment, ultraviolet light irradiation treatment and the like, for the purpose of improving the wettability and the adhesiveness.

Whereas it is possible to practice the invention on a batch basis with a stationary support surface, to gain full advantage of the invention, it is much preferred to practice it on a continuous basis using a moving support surface such as a roll-driven continuous web or belt. Using such apparatus the polymerizable composition can be made on a continuous basis or it can be made on a large batch basis, and the composition applied continuously onto the upstream end of the driven continuous belt support surface, the polymerization effecting means (such as an irradiation source, a heat source, a plasma generator) being located above the belt downstream of the composition application station and the membrane removal station—if applicable—being further downstream of the belt, the membrane being removed in the form of a continuous sheet thereof. Removal of any water or solvent from the membrane can be accomplished either before or after the membrane is taken from the belt. For this embodiment and all others where it is desired to remove the membrane from the support surface, it is, of course, preferable that the support surface be such as to facilitate as much as possible the removal of the membrane therefrom. Typical of the support surfaces useful for the practice of such embodiments have a low surface energy and are smooth, stainless steel sheet or, better yet, teflon or teflon-coated metal sheet. Rather than using a continuous belt, the support surface can be of an expendable material, such as release paper, resin coated paper, plastic film, or the like (but not soluble in the solvent when present), in the form of a roll thereof such that it can be continuously unrolled from the roll, upstream of the solution application station, as a continuous driven length and then rerolled, with the membrane thereon, downstream of the radiation station. In another embodiment the membrane is not separated from the support in which case the support is preferably sufficiently porous to enable a high flux through the membrane. Examples of porous support include woven materials, non-woven materials, porous polymeric membranes, porous inorganic membranes. The porous support is not limited to sheet form, also porous supports in tubular form like hollow fibers can be used. Removal of the solvent preferably is done before rerolling the support with the membrane thereon but may also be done at a later stage.

The membrane of the invention is preferably used in a module wherein the membrane is assembled into a cartridge. The membrane geometry influences the manner in which the membrane is packaged. The preferred membrane cartridge geometries are flatsheet, spiral-wound and hollow-fiber.

While we have emphasised the usefulness of the membranes of the present invention for separating gases it will be understood that the present invention is not limited to gas permeable membranes.

The present invention will be illustrated in more detail by the following non-limiting examples. Unless stated otherwise, all given ratios and amounts are based on weight.

EXAMPLES

Preparation of the Membrane

A mixture was prepared for each example as described below.

The mixture was coated on a glass plate by a bar coater (Spiral wound K Bar from R K Print Coat Instruments Ltd.) at 200 micrometer coating thickness, and cured by exposure to UV light using a Light-Hammer™ fitted in a bench-top conveyor LC6E (both supplied by Fusion UV Systems) with 100% UV power (D-bulb) and a conveyer speed of 15 m/min.

The cured film (membrane) was removed from the glass plate and dried at 40° C. for 30 min.

Evaluation of the Physical Property of the Membrane

The physical strength (bendability) of the membrane was evaluated by bending the obtained free film around a plastic plate of 3 mm thickness and ranked A-E according the result of the test.

A: bendable without breaking over 150°,
B: breaks between 120° and 150°,
C: breaks between 90° and 120°,
D: breaks between 60° and 90°,
E: breaks at <60°

Calculation of EO Content of the Membrane

The EO content of the membrane is calculated by determining the EO content of the non volatile components whereby the support is not included—in case the membrane is not separated from the support. The EO content of the crosslinkable compounds is given in the tables below. The EO content of Zonyl™ FSN100 was estimated as 60%. Additol™ HDMAP does not contain EO-groups. The EO content is calculated as follows:

EO content={(wt % of each non-volatile compound)*(avg MW of oxyethylene fraction in each non-volatile compound)/(avg. MW of each non-volatile compound)}/{total solid content}, wherein the total solid content of the composition is formed by the non-volatile components. The results are given in the tables below.

Evaluation of the Gas Permeability

Flux of $CO_2$ and $N_2$ through the obtained film was measured at 80° C. and gas feed pressure of 2000 kPa (20 bar) using a gas permeation cell from Millipore with a measurement diameter of 4.2 cm for each gas separately. Permeability P was calculated based on the following equation.

$$P = F \times L \times 10^{-12}/(60 \times A \times p) \text{(unit: } m^3(STP) \cdot m/m^2 \cdot s \cdot kPa)$$

Where F is gas flow (SCCM), L is membrane thickness (micrometer), A is membrane area=0.001385 $m^2$, p is feed gas pressure (kPa), and "x" stands for multiply. STP is Standard Temperature and Pressure, which is 0° C. and 1 atm, thus 1 $m^3$ (STP) is 1 $m^3$ at STP condition, SCCM is "standard cc/min", which is flow (cc/min) at STP condition ($cm^3(STP)$/min=$\times 10^{-6}$ $m^3$(STP)/min). Gas flow is measured by a digital flow meter.

Selectivity ($\alpha_{CO2/N2}$) was calculated based on following equation:

$$\alpha_{CO2/N2} = P_{CO2}/P_{N2}$$

Comparative Example 1

50 parts of PEG600DA (Poly(ethylene glycol) diacrylate, average Mn-700 Da from Sigma Aldrich) were mixed with 0.09 parts of Zonyl™ FSN100 (from DuPont), 0.5 parts of Additol™ HDMAP (2-hydroxy-2-methyl-1-phenyl-1-propanone from Cytec Surface Specialities), and 49.4 parts of water.

The mixture was coated and cured according the procedure mentioned above, and evaluated.

The cured mixture before drying had a gel-like appearance and after drying the film could be removed from the glass plate but was very easy to break (not bendable).

Thickness of the dried film was 150 micrometer.

The $CO_2$ flow through the film was 1.58 SCCM, and the $N_2$ flow was below detection limit of the flow meter (0.2 SCCM). Therefore the $CO_2$ permeability is: $(1.58 \times 150 \times 10^{-12})/(60 \times 0.001385 \times 2000) = 1.426 \times 10^{-12}$ $m^3(STP) \cdot m/m^2 \cdot s \cdot kPa$.

Since the $N_2$ flow is less than 0.2 SCCM, the $N_2$ permeability is less than 0.18 $m^3(STP) \cdot m/m^2 \cdot s \cdot kPa$ (=$(0.2 \times 150 \times 10^{-12})/(60 \times 0.001385 \times 2000)$), therefore the $CO_2/N_2$ selectivity $\alpha_{CO2/N2} = P_{CO2}/P_{N2}$ more than 1.426/0.18=7.9.

The water permeance at 20° C. of the membrane and was found to be lower than $1.4 \times 10^{-9}$ $m^3/m^2 \cdot s \cdot kPa$.

Comparative Example 2

50 parts of BPA-(EO)30-DMA (Bisphenol A ethoxylate dimethacrylate, average Mn=1700 Da, from Sigma Aldrich) were mixed with 0.09 parts of Zonyl™ FSN100 (from DuPont), 0.5 parts of Additol™ HDMAP (from Cytec Surface Specialities), and 49.4 parts of water.

The mixture was coated and cured according the same procedure as in comparative example 1. The cured mixture was still wet and had not become gel-like; after drying it was a very viscous liquid which couldn't be removed as film. Thus no further evaluation on physical property and gas permeability could be done.

Example 1

50 parts of CD9038 (Ethoxylated (30) Bisphenol A diacrylate, Mn=1656 Da from Sartomer) were mixed with 0.09 parts of Zonyl™ FSN100 (from DuPont), 0.5 parts of Additol™ HDMAP (from Cytec Surface Specialities), and 49.4 parts of water.

The mixture was coated and cured according the same procedure as in comparative example 1. The cured mixture before drying had a gel-like appearance. After drying the film could be removed from the glass plate and was bendable to some extent) (>120°. Thickness of the dried film was 150 micrometer.

The $CO_2$ flow through the film was 2.66 SCCM, and the $N_2$ flow was below detection limit of the flow meter (0.2 SCCM). Therefore the $CO_2$ permeability is: $(2.66 \times 150 \times 10^{-12})/(60 \times 0.001385 \times 2000) = 2.39 \times 10^{-12}$ $m^3(STP) \cdot m/m^2 \cdot s \cdot kPa$.

Since the $N_2$ flow is less than 0.2 SCCM, the $N_2$ permeability is less than 0.18 $m^3(STP) \cdot m/m^2 \cdot s \cdot kPa$ $(=(0.2 \times 150 \times 10^{-12})/(60 \times 0.001385 \times 2000))$, therefore the $CO_2/N_2$ selectivity $\alpha_{CO2/N2} = P_{CO2}/P_{N2}$ is more than $2.39/0.18 = 13.2$.

The water permeance at 20° C. of the membrane was found to be lower than $1.4 \times 10^{-9}$ $m^3/m^2 \cdot s \cdot kPa$.

Example 2

Example 2 was done according the same procedure as in Example 1, except that PRO4252 (Poly(ethylene glycol) 1450 diacrylate (Mn=1578 Da) from Sartomer), was used instead of CD9038. The cured mixture before drying had a gel-like appearance and after drying the film could be removed from the glass plate. The result is shown in Table 1.

Example 3

Example 3 was done according the same procedure as in Example 1, except that PEG2000DA (Poly(ethylene glycol) 2000 diacrylate (Mn=2126 Da) from Monomer-Polymer & Dajac Laboratories, Inc.) was used instead of CD9038. The cured mixture before drying had a gel-like appearance and after drying the film could be removed from the glass plate. The result is shown in Table 1.

Example 4

Example 4 was done according the same procedure as in Example 1, except that PEG4000DA (Poly(ethylene glycol) 4000 diacrylate (Mn=4126 Da) from Monomer-Polymer & Dajac Laboratories, Inc.) was used instead of CD9038. The cured mixture before drying had a gel-like appearance and after drying the film could be removed from the glass plate. The result is shown in Table 1.

Observation of the membrane surface and cross section by SEM (scanning electron microscope) showed that no pores were visible indicating that the pore sizes—if present—are smaller than 10 nm.

The physical strength (bendability) of the membrane was best with the polymerizable compound having the largest relative oxyethylene content and thus with the highest molecular weight.

Using polymerizable compounds with a high oxyethylene content resulted in high permeability values.

Due to the very low nitrogen flow below the detection limit of the flow meter used (down to 0.2 SCCM), only a minimum value for the selectivity could be confirmed.

Experiments with Mixtures of Polymerizable Compound with MPEG-A (poly(ethylene glycol) methyl ether acrylate)

Comparative Example 3

Comparative Example 3 was done according the same procedure as in Example 1, except that 25 parts of PEG600DA and 25 parts MPEG-A (Poly(ethylene glycol) methyl ether acrylate, Mn~454 Da, from Sigma Aldrich) were used instead of 50 parts of PEG600DA. The result is shown in Table 2.

Example 5

Example 5 was done according the same procedure as in Comparative Example 3, except that CD9038 was used instead of PEG600DA. The result is shown in Table 2.

Example 6

Example 6 was done according the same procedure as in Comparative Example 3, except that PRO4252 was used instead of PEG600DA. The result is shown in Table 2.

Comparative Example 4

Comparative Example 4 was done according the same procedure as in Comparative Example 3, except that CN435 (Ethoxylated (15) trimethylolpropane triacrylate, from Sartomer) was used instead of PEG600DA. The obtained film was very brittle and broke easily so gas permeation properties could not be measured. The result is shown in Table 2.

TABLE 1

| | Monomer | Vinyl group | EO content of monomer | Mn (Da) | EO content of membrane | Bendability | $CO_2$ permeability P | $\alpha_{CO2/N2}$ |
|---|---|---|---|---|---|---|---|---|
| Comparative example 1 | PEG 600DA | Acrylate | 82.0% | 700 | 81.2 | E | 1.425 | >7.9 |
| Comparative Example 2 | BPA-(EO)30-DMA | Methacrylate | 79.5% | 1700 | 78.7 | — | — | — |
| Example 1 | CD9038 | Acrylate | 79.7% | 1656 | 78.9 | C | 2.39 | >13 |
| Example 2 | PRO 4252 | Acrylate | 92.0% | 1578 | 91.0 | B | 3.17 | >18 |
| Example 3 | PEG 2000DA | Acrylate | 94.1% | 2126 | 93.1 | A | 3.65 | >21 |
| Example 4 | PEG 4000DA | Acrylate | 96.9% | 4126 | 95.9 | A | 4.70 | >26 |

Mn: molecular weight of the cross-linkable monomer.
Unit of permeability P: $\times 10^{-12}$ $m^3(STP) \cdot m/m^2 \cdot s \cdot kPa$ The water permeance at 20° C. of the membranes (except example 2) was found to be lower than $1.4 \times 10^{-9}$ $m^2 \cdot s \cdot kPa$.

Results

The polymerization of all examples with acrylate groups by curing with UV light went OK. The example with methacrylate groups gave insufficient curing, the film could not be separated from the support.

Example 7

Example 7 was done according the same procedure as in Comparative Example 3, except that AT-30E (Ethoxylated (30) trimethylolpropane triacrylate, from Shin-Nakamura Chemicals) was used instead of PEG600DA. The result is shown in Table 2.

TABLE 2

| | Cross-linkable monomer | F | EO content of monomer | Mn (Da) | EO content of membrane | Bendability | $CO_2$ permeability P | $\alpha_{CO2/N2}$ |
|---|---|---|---|---|---|---|---|---|
| Comparative Example 3 | PEG 600DA | 2 | 82% | 700 | 80.7 | D | 3.05 | >17 |
| Example 5 | CD9038 | 2 | 79.7% | 1656 | 79.6 | B | 4.20 | >24 |
| Example 6 | PRO 4252 | 2 | 92% | 1578 | 85.6 | A | 4.81 | >27 |
| Comparative Example 4 | CN435 | 3 | 69% | 956 | 74.3 | E | — | — |
| Example 7 | AT-30E | 3 | 81.7% | 1616 | 80.6 | C | 3.82 | >22 | f: functionality of the cross-linkable monomer (number of unsaturated groups in the cross-linkable monomer)
The EO content of MPEG-A is 81.1%.
Mn: molecular weight of the cross-linkable monomer.
Unit of permeability P: × $10^{-12}$ $m^3(STP) \cdot m/m^2 \cdot s \cdot kPa$ The water permeance at 20° C. of the membranes (except comparative example 4) was found to be lower than 1.4× $10^{-9}/m^2 \cdot s \cdot kPa$.

Results

The results obtained with mixtures of polymerizable compounds and monofunctional monomers are in agreement with the results described above with polymerizable compounds only except that with the mixtures higher permeability values are obtained. This result can be explained by a lower cross-linking density because the monofunctional monomers are cured into the matrix but do not contribute to the crosslinking density. So a higher oxyethylene content results in a membrane with a higher strength and a higher permeability for $CO_2$.

Examples of Composite Membranes

Example 8

A curable composition was made by mixing 8 parts of CD9038 (Ethoxylated (30) Bisphenol A diacrylate, Mn=1656 Da from Sartomer) and 2 parts of Aquacalk TWB (a chemically crosslinked poly(oxyalkylene) from Sumitomo Seika), with 0.3 parts of Zonyl™ FSN100 (from DuPont), 0.5 parts of Additol™ HDMAP (from Cytec Surface Specialities), 6 parts of isopropanol and 83.2 parts of water. A polyacrylonitrile membrane GMT-L-6 from GMT Membrantechnik GmbH, Germany was used as porous support. A composite membrane was formed by a simultaneous multilayer process. In this process an inert liquid and the curable composition were applied continuously to the porous membrane using a slide bead coater using 2 slots, an irradiation source and a composite membrane collecting station. The porous support moved at a speed of 30 m/min from the slide bead coater to the irradiation source and then on to the drying station. Water was used as inert liquid. The water was applied as lower layer (lower slot) with 100 micron thickness, and the curable composition was applied as upper layer (higher slot) with 15 micron thickness. The temperature of both the inert liquid as the curable composition was 35° C. The coated membrane passed under UV curing device Light Hammer LH6 from Fusion UV Systems, applying 100% intensity of the installed UV-lamp (D-bulb), then the line proceeded further to the drying zone with a temperature of 40° C. and 8% relative humidity.

The $CO_2$ flow through the film was determined at 23° C. and at 2000 kPa giving a value of 73.8 SCCM, corresponding with a $CO_2$ permeance of 4.44×$10^{-7}$ $m^3(STP)/m^2 \cdot s \cdot kPa$. The $N_2$ flow at 23° C. and at 2000 kPa was 1.2 SCCM, corresponding with a $N_2$ permeance of 7.20×$10^{-9}$ $m^3(STP)/m^2 \cdot s \cdot kPa$. The resultant composite membrane had a good $CO_2$ selectivity ($\alpha$CO2/N2=62).

SEM analysis confirmed that a non-porous layer of 0.925 micron thickness had formed on the porous support.

The Oxyethylene (EO) content of Aquacalk TWB was estimated as 95%; the EO content of the non-porous layer was 78.3 wt %.

The water permeance at 20° C. of the membrane was found to be 1.1×$10^{-8}$ $m^3/m^2 \cdot s \cdot kPa$.

Example 9

A composite membrane was prepared by a consecutive multilayer process using the curable composition and the support of Example 8. As a first step the polyacrylonitrile membrane passed through a bath filled with water as inert liquid and excessive liquid droplets on the surfaces were removed by air knife. The saturated membrane was then coated with the curable composition by a slide bead coater (using one slot) with 15 micron thickness at a speed of 30 m/min. Subsequent curing and drying steps were as described in Example 8 above.

The $CO_2$ flow through the film at 23° C. and at 2000 kPa was 71.9 SCCM, corresponding with a $CO_2$ permeance of 5.39×$10^{-7}$ $m^3(STP) \cdot m/m^2 \cdot s \cdot kPa$. The $N_2$ flow at 23° C. and at 2000 kPa was 1.07 SCCM, corresponding with a $N_2$ permeance of 8.03×$10^{-9}$ $m^3(STP)/m^2 \cdot s \cdot kPa$. The resultant composite membrane gave good $CO_2$ selectivity (aCO2/N2=67).

SEM analysis confirmed that a non-porous layer of 1.2 micron thickness had formed on the porous support.

Oxyethylene content of the non-porous layer was 78.3 wt %.

The invention claimed is:

1. Membrane comprising a continuous substantially non-porous layer comprising the polymerization product of a composition comprising a compound, which compound comprises at least 75 weight % of —(—$CH_2$—$CH_2$—O—)— (oxyethylene) groups and has a molecular weight of at least 1500 Da and has at least two polymerizable groups, each polymerizable group comprising a $CH_2$=CH— (non-substituted vinyl) group, wherein the oxyethylene groups form an uninterrupted chain of formula —($CH_2$ $CH_2$O)$_n$— wherein n is at least 25.

2. Membrane according to claim 1 wherein said polymerizable groups are selected from acrylate groups, acrylamide groups, vinyl ether groups, vinyl ester groups, vinyl amide groups, allyl ether groups, allyl ester groups, allyl amine groups, allyl amide groups, styryl groups and combinations thereof.

3. Membrane according to claim 1 wherein at least one of said polymerizable groups is an acrylate group.

4. Membrane according to claim 1 wherein at least two of said polymerizable groups are acrylate groups.

5. Membrane according to claim 1 wherein said composition comprises 3-80 weight % of said compound.

6. Membrane according to claim 1 wherein said composition comprises 5-60 weight % of said compound.

7. Membrane according to claim 1 wherein said continuous substantially non-porous layer comprises at least 60 weight % of oxyethylene groups.

8. Membrane according to claim 1 wherein the pure water permeance of the membrane at 20° C. is less than $6.10^{-8}$ m$^3$/m$^2$.s.kPa.

9. Membrane according to claim 1 joined to a porous support.

10. Membrane according to claim 1 wherein the compound has more than 90 weight % of oxyethylene groups.

11. Membrane according to claim 1 wherein at least two of said polymerizable groups are acrylate groups, the compound has more than 90 weight % of oxyethylene groups and the pure water permeance of the membrane at 20° C. is less than $6.10^{-8}$ m$^3$/m$^2$.s.kPa.

12. A module comprising at least one cartridge and at least one membrane according to claim 1.

13. A module comprising at least one cartridge and at least one membrane according to claim 10.

14. A module comprising at least one cartridge and at least one membrane according to claim 11.

15. A module according to claim 12 wherein the membrane has a flatsheet, spiral-wound or hollow fiber geometry.

16. A module according to claim 13 wherein the membrane has a flatsheet, spiral-wound or hollow fiber geometry.

17. A module according to claim 14 wherein the membrane has a flatsheet, spiral-wound or hollow fiber geometry.

18. Process for making a membrane according to claim 1 comprising the steps of:
   a. providing said composition;
   b. applying said composition to a support;
   c. polymerizing said composition thereby forming a substantially non-porous polymer film;
   d. optionally separating the polymer film from the support; and
   e. optionally washing and/or drying the polymer film.

19. Process according to claim 18 wherein the coating step is continuous.

20. Process according to claim 18 wherein the polymerization step comprises exposure of the applied layer to radiation for less than 1 second.

21. Membrane according to claim 1 for separation of polar gases and/or vapors from non-polar gases and/or vapors.

* * * * *